US009455900B2

(12) United States Patent
Sathappan et al.

(10) Patent No.: US 9,455,900 B2
(45) Date of Patent: *Sep. 27, 2016

(54) METHOD AND APPARATUS FOR SHORTEST PATH BRIDGING OF MULTICAST TRAFFIC

(71) Applicant: Alcatel Lucent, Boulogne Billancourt (FR)

(72) Inventors: Senthil Sathappan, San Jose, CA (US); Paul Kwok, Sunnyvale, CA (US); Donald W. Fedyk, Groton, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 30 days.

This patent is subject to a terminal disclaimer.

(21) Appl. No.: 14/248,112

(22) Filed: Apr. 8, 2014

(65) Prior Publication Data

US 2014/0219105 A1    Aug. 7, 2014

Related U.S. Application Data

(63) Continuation of application No. 13/231,588, filed on Sep. 13, 2011, now Pat. No. 8,693,315.

(51) Int. Cl.
*H04L 12/721* (2013.01)
*H04L 12/18* (2006.01)
*H04L 12/46* (2006.01)
*H04L 12/761* (2013.01)
*H04L 12/753* (2013.01)

(52) U.S. Cl.
CPC .............. *H04L 45/12* (2013.01); *H04L 12/18* (2013.01); *H04L 12/4641* (2013.01); *H04L 45/16* (2013.01); *H04L 45/48* (2013.01)

(58) Field of Classification Search
CPC ....... H04W 40/02; H04L 12/44; H04L 45/12
See application file for complete search history.

(56) References Cited

U.S. PATENT DOCUMENTS

| 7,697,456 | B2 | 4/2010 | Ekl et al. | |
| 8,693,315 | B2 | 4/2014 | Sathappan | |
| 2002/0126671 | A1* | 9/2002 | Ellis | H04L 12/18 370/390 |
| 2007/0140107 | A1* | 6/2007 | Eckert | H04L 12/18 370/216 |
| 2008/0101326 | A1* | 5/2008 | Zhang | H04W 56/0085 370/345 |
| 2009/0080345 | A1 | 3/2009 | Gray | |
| 2009/0161584 | A1 | 6/2009 | Guan | |
| 2010/0165884 | A1 | 7/2010 | Farkas et al. | |
| 2010/0260178 | A1 | 10/2010 | Huang et al. | |

(Continued)

FOREIGN PATENT DOCUMENTS

| CN | 101631274 | 1/2010 |
| CN | 101729274 | 6/2010 |

(Continued)

OTHER PUBLICATIONS

The International Search Report and the Written Opinion of the International Searching Authority, or the Declaration, in PCT/US2012/054215, mailed Nov. 5, 2012, Alcatel-Lucent USA Inc., Applicant, 17 pages.

(Continued)

*Primary Examiner* — Benjamin H Elliott, IV
(74) *Attorney, Agent, or Firm* — Tong, Rea, Bentley & Kim, LLC

(57) ABSTRACT

Methods, system and apparatus for determining shortest path bridging (SPB) within a communications network.

38 Claims, 4 Drawing Sheets

(56) References Cited

U.S. PATENT DOCUMENTS

| | | | |
|---|---|---|---|
| 2010/0309912 A1 | 12/2010 | Mehta et al. | |
| 2011/0228774 A1 | 9/2011 | Saltsidis et al. | |
| 2012/0106347 A1 | 5/2012 | Allan et al. | |
| 2012/0120803 A1 | 5/2012 | Farkas et al. | |
| 2012/0207159 A1* | 8/2012 | Buchko | H04L 45/16 370/390 |
| 2014/0219105 A1* | 8/2014 | Sathappan | H04L 12/18 370/238 |

FOREIGN PATENT DOCUMENTS

| | | |
|---|---|---|
| JP | 2006-074379 | 3/2006 |
| JP | 2008-539612 | 11/2008 |
| WO | WO 2011/038750 A1 | 4/2011 |

OTHER PUBLICATIONS

Sofia R: "A Survey of advanced ethernet forwarding approaches", IEEE Communications Surveys, IEEE, New York, NY, US, vol. 11, No. 1, Jan. 1, 2009, pp. 92-115, XP011252848, ISSN: 1553-877X.
"IS-IS Multicast Synchronization Digest; aq-fedyk-ISIS-digest-1108-v1", IEEE Draft; AQ-FEDYK-ISIS-DIGEST-1108-V1, IEEE-SA, Piscataway, NJ USA, vol. 802.1, no. v1, Nov. 8, 2008, pp. 1-6, XP017642240, [retrieved on Nov. 8, 2008].
Don Fedyk and Paul Bottorff et al: "Provider Link State Bridging (PLSB); aq-fedyk-provider-link-state-bridging-0107-01", IEEE Draft; AQ-FEDYK-PROVIDER-LINK-STATE-BRIDGING-0107-01, IEEE-SA, Piscataway, NJ USA, vol. 802.1, Jan. 3, 2007, pp. 1-10, XP017641425, [retrieved on Jan. 3, 2007).
Allan D et al: "Provider link state bridging", IEEE Communications Magazine, IEEE Service Center, Piscataway, US, vol. 46, No. 9, Sep. 1, 2008, pp. 110-117, XP011234296, ISSN: 0163-6804, DOI: 10.1109/MCOM.2008.4623715.
Allan D et al: "Shortest path bridging: Efficient control of larger ethernet networks", IEEE Communications Magazine, IEEE Service Center, Piscataway, US, vol. 48, No. 10, Oct. 1, 2010, pp. 128-235, XP011319416, ISSN: 0163-6804.
"Shortest Path Bridging IEEE 802.1aq Overview; aq-fedyk-SPB-DataCenter-tutorial-0710-v1", IEEE Draft; AQ-FEDYK-SPB-DATACENTER-TUTORIAL-0710-V1, IEEE-SA, Piscataway, NJ USA, vol. 802.1, No. v1, Jul. 14, 2010, pp. 1-37, XP017643128, [retrieved on Jul. 14, 2010].
"IS-IS Extensions Supporting IEEE 802.1aq Shortest Path Bridging," IEEE DRAFT-IETF-ISIS-IEEE-AQ-05.txt; Mar. 8, 2011, 37 pages [retrieved on Aug. 31, 2011].
IEEE Standards Draft, Local and Metropolitan Area Networks, P802.1aq/D4.0, Jun. 14, 2011, pp. 4-6.
IEEE Standards Draft, Local and Metropolitan Area Networks, P802.1 aq/D4.0, Jun. 14, 2011, pp. 216-259.

* cited by examiner

METHOD AND APPARATUS FOR SHORTEST PATH BRIDGING OF MULTICAST TRAFFIC

CROSS-REFERENCE TO RELATED APPLICATIONS

This application is a continuation of U.S. patent application Ser. No. 13/231,588, filed on Sep. 13, 2011, entitled METHOD AND APPARATUS FOR SHORTEST PATH BRIDGING OF MULTICAST TRAFFIC, now U.S. Pat. No. 8,693,315, which application is incorporated by reference herein in its entirety.

FIELD OF THE INVENTION

The invention relates to the field of transport networks and, more specifically but not exclusively, to providing shortest path bridging of multicast traffic in transport networks.

BACKGROUND

Shortest Path Bridging (SPB) is an emerging standard that specifies methods to overcome traditional inefficiencies in Ethernet based networks by using shortest path based forwarding for unicast and multicast traffic. For multicast, SPB specifies a mechanism referred to as source/group tree that requires building a multicast tree per source node and per Equal cost tree algorithm. This has two main issues; namely, the consumption of computing resources, and the consumption of multicast addresses or other data resources such as shortest path Virtual Local Area Network (VLAN) identifiers. In particular, the computational resources consumed at each node correspond to the number of nodes in the network. Further, the multicast forwarding or filter entries consumed at each node is proportional to the number of nodes in the network that the respective node must send or transit traffic towards.

IEEE Draft Standard P802.1aq, entitled Local and Metropolitan Area Networks-Virtual Bridged Local Area Networks-Shortest Path Bridging specifies shortest path bridging of unicast and multicast frames, including protocols to calculate multiple active topologies that can share learned station information, and support of a VLAN by multiple, per topology VLAN identifiers (VIDs). IEEE Draft Standard P802.1aq is incorporated herein by reference in its entirety.

There are several techniques known for reducing overhead of source specific trees for each service instance (I-SID). According to one technique, head end replications are used with unicast paths. Unfortunately, this technique wastes bandwidth throughout the network. According to another technique, grouping is used to reduce the number of service specific addresses. Unfortunately, this technique is inefficient and uses a high number of trees.

SUMMARY

Various deficiencies in the prior art are addressed by methods, systems and apparatus for determining shortest path bridging (SPB) of multicast frames within a communications network in a manner minimizing computational resource consumption and the number multicast forwarding or filter entries consumed at each node.

One embodiment of a method for determining shortest path bridging (SPB) of multicast frames within a communications network comprises at each of a plurality of nodes within the network, determining a designated node (DN) according to a commonly agreed mechanism; at each of the plurality of nodes, determining a shortest path between the DN and each of the plurality of nodes; and at each of the plurality of nodes, selecting for inclusion in a respective forwarding tree for multicast only those determined shortest paths from the DN traversing the respective node.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Various embodiments of the invention are directed toward determining shortest path bridging (SPB) of unicast and multicast frames within a communications network in a manner minimizing computational resource consumption and the number multicast forwarding or filter entries consumed at each node.

In various embodiments, different paths are allowed to support unicast and multicast traffic. In various embodiments, different cost factors for weight are associated with the unicast and multicast paths or path elements. In various embodiments, one or more trees (referred to as "star, Group trees" or "*,G trees") are computed once per communications node (CN) to define multicast paths, where the *,G tree is computed according to a commonly agreed mechanism so that each of the respective nodes within a totality of nodes, a portion of the totality of nodes, a subset of service instances and the like will converge upon a common determination of a designated node(s).

The determinations of SPB of unicast and multicast frames is primarily depicted and described within the context of propagating unicast traffic and multicast traffic within Ethernet-based transport networks; however, it will be appreciated by one skilled in the art and informed by the teachings herein that the traffic propagation capability depicted and described herein may be used to provide transport of unicast and multicast traffic in other types of networks.

Figure 1:
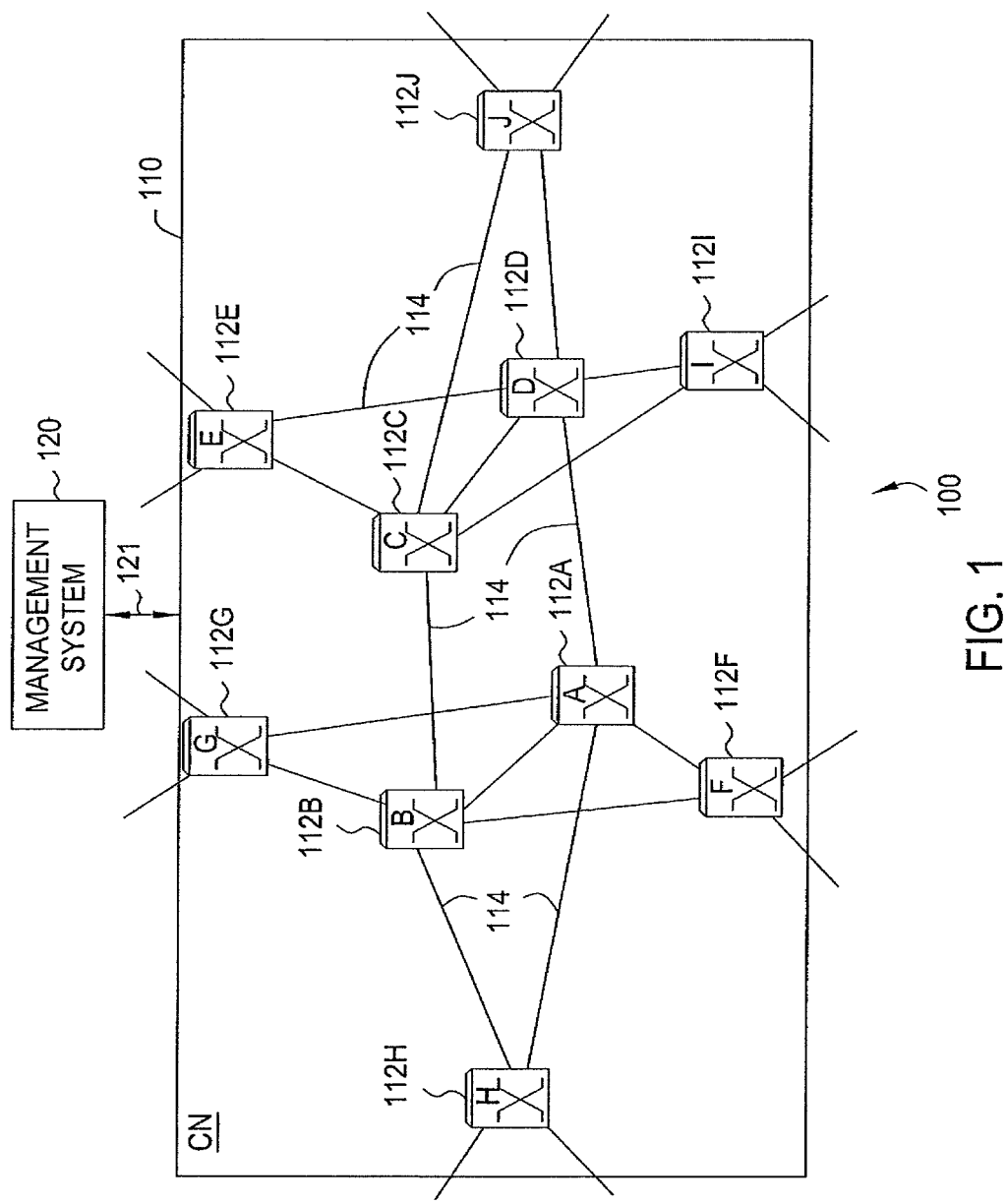
FIG. 1 depicts a high-level block diagram of a communication network.

FIG. 1 depicts a high-level block diagram of a communication network. As depicted in FIG. 1, communication network 100 includes a communication network (CN) 110 and a management system (MS) 120. The CN 110 is a network including a plurality of communication nodes (CNs) 112$_A$-112$_J$ (collectively, CNs 112). The CNs 112 communicate using a plurality of communication paths (CPs) 114. It will be appreciated by those skilled in the art that the communication network 110 may comprise more or fewer communication nodes 112.

The CNs 112 of CN 110 are transport nodes. In one embodiment, in which CN 110 is an Ethernet-based transport network, CNs 112 are Ethernet transport nodes. In this embodiment, the CNs 112 each support Ethernet capabilities, such as forwarding and bridging capabilities, as well as any other capabilities which may be supported by Ethernet-based transport nodes. The CNs 112 may be nodes associated with other transport technologies.

The CPs 114 of CN 110 are communication paths, which may include direct connections between the CNs 112 and/or indirect connections between the CNs 112 such as connections which may traverse other nodes (not shown). The CPs 114 may be any type of communication paths adapted for supporting traffic for CNs 112. The CPs 114 may support propagation of traffic using any underlying technologies suitable for supporting propagation of traffic.

Although depicted and described herein with respect to specific types, numbers, and topologies of communication nodes and communication paths (illustratively, the CNs 112 and CPs 114 of CN 110), it will be appreciated, by those skilled in the art and informed by the teachings herein, that the fault-resilient traffic propagation capabilities depicted and described herein may be utilized in transport networks having other types, numbers, and topologies of communication nodes and communication paths.

The MS 120 is a management system providing management functions for CN 110. The management functions which may be provided by MS 120 are described in detail hereinbelow. The MS 120 communicates with CN 110 via a communication path (CP) 121. The MS 120 communicates with each of the CNs 112 of CN 110 via CP 121 and CPs 114 of CN 110. The MS 120 may communicate with the CNs 112 in any other suitable manner.

Referring to FIG. 1, communication node 112A (A) is coupled to communication nodes B, D, F, G and H; communication node 112B is coupled to communication nodes A, C, F, G and H; communication node 112C is coupled to communication nodes B, D, E, I and J; communication node 112D is coupled to communication nodes A, C, E, I and J; communication node 112E is coupled to communication nodes C and D; communication node 112F is coupled to communication nodes A and B; communication node 112G is coupled to communication nodes A and B; communication node 112H is coupled to communication nodes A and B; communication node 112I is coupled to communication nodes C and D; and communication node 112J is coupled to communication nodes C and D.

Various embodiments of the invention utilize a single tree, referred to as a (star, Group tree) (or *,G tree), that is computed based on an agreed algorithm or mechanism. Unlike the use of *,G trees in Ethernet networks (where both unicast and multicast traffic must use the same tree), the various embodiments contemplate separate trees for unicast and multicast traffic while maintaining forwarding for each.

Generally speaking, within the context of the various embodiments a node is selected to be a designated node and becomes the designated node of the *,G tree. This reduces the computation to a single computation per multicast tree for multicast forwarding paths. Every node in the network performs the same computation based on the same database or other criteria. Every node in the network selects a designated node and, in a converged topology, all of the nodes select the same node as the designated node. The benefits are twofold; namely, the number of multicast entries is reduced to one per Service instance, and a single multicast computation is performed only per designated node in the network.

Within the context of the various embodiments, it is noted that resulting multicast traffic is not necessarily congruent with (i.e., taking the same path as) unicast traffic. One consequence of the loss of congruency is that Operations Administration and Maintenance functions (OAM) such as connectivity checks and path traces are modified for unicast paths to use unicast forwarding mechanisms. Similarly, OAM for multicast paths uses multicast forwarding mechanisms. Another consequence is that forwarding rules for unicast traffic, such as at ingress check where the frame source is checked to be valid, are performed with respect to the unicast forwarding path, while forwarding rules for multicast traffic are performed with respect to the multicast path.

Various embodiments allow for the current encoding of Provider Backbone Bridging (PBB) multicast such as by using a data structure comprising a first field including an Organizationally Unique Identifier (OUI), and a second field including 24 bits of PBB service identifier I-SID. In one embodiment, the data structure comprises a 48-bit data structure comprising a first field including up to 20 bits of a reserved IEEE 802.1Q Backbone Service Instance Group address Organizationally Unique Identifier (OUI) and a second field including 24 bits of PBB service identifier I-SID. This data structure has been found by the inventors to be more efficient than the source specific multicast data structure which uses a unique source identifier plus 24 bit I-SID.

Figure 2:
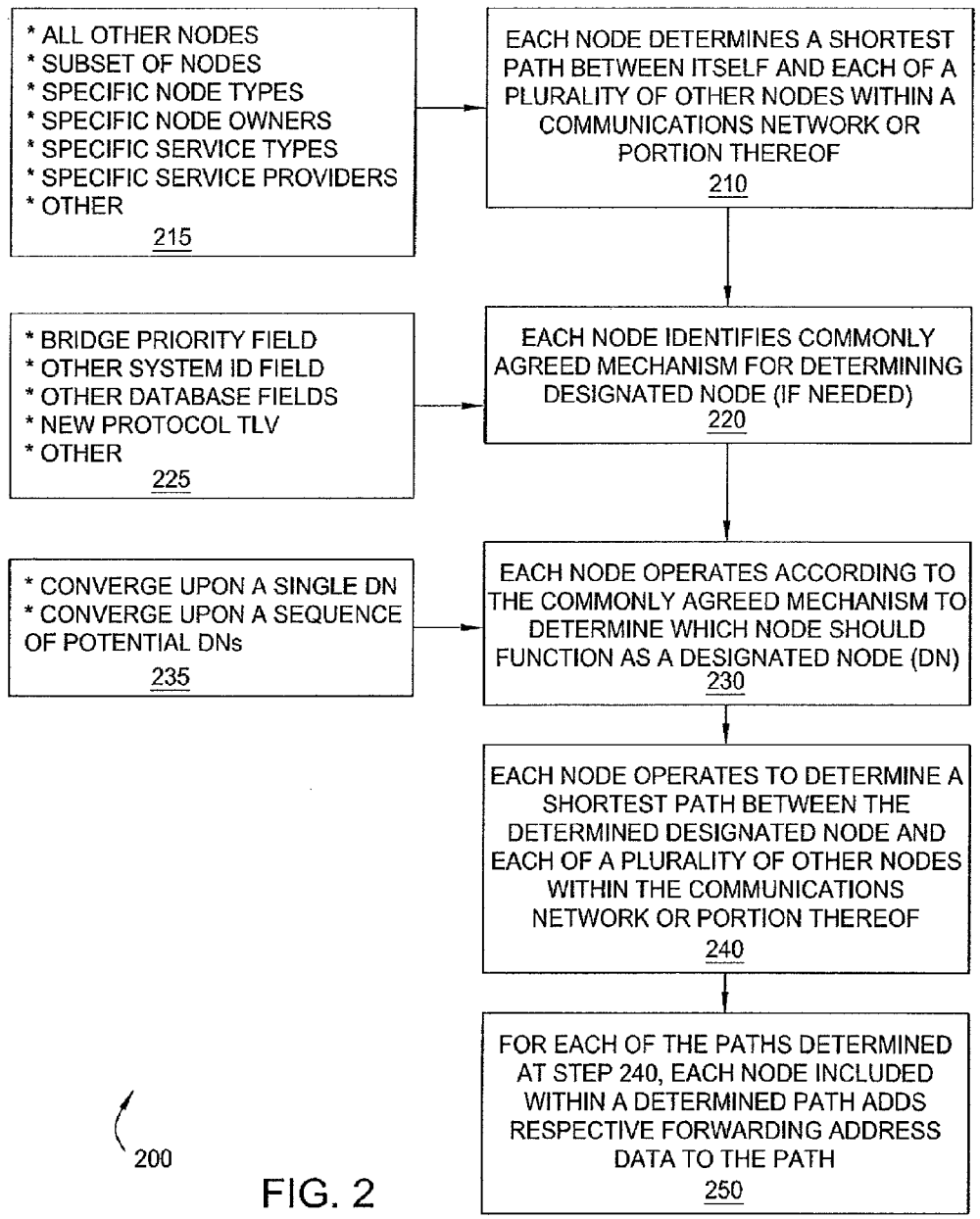
FIG. 2 depicts a flow diagram of a method according to one embodiment.

FIG. 2 depicts a flow diagram of a method according to one embodiment. Specifically, the method 200 of FIG. 2 is adapted to determine shortest path bridging (SPB) of unicast and multicast frames within a communications network in a manner minimizing computational resource consumption and the number multicast forwarding or filter entries consumed at each node.

At step 210, each node determines a shortest path between itself and each of a plurality of other nodes of interest within a communications network or relevant portion thereof. The determined shortest path is typically a unicast path. Referring to box 215, the plurality of other nodes used for this determination may comprise all of the other nodes in the communications network, a subset of the other nodes, specific types of other nodes, nodes associated with specific owners, nodes associated with specific services, nodes associated with specific service providers, nodes associated with specific service instances or subsets of service instances and so on.

At step 220, each node identifies a commonly agreed mechanism for determining designated node (if needed). In various embodiments, the commonly agreed mechanism never changes. In other embodiments, the commonly agreed mechanism may change such as via the network management system. Specifically, the commonly agreed mechanism is a mechanism for determining which node should operate as a designated node (DN), backup DN, backup DN sequence and the like as discussed below.

The commonly agreed mechanism may comprise any mechanism that allows each respective node within a totality of nodes, a portion of the totality of nodes, a subset of nodes, specific types of other nodes, nodes associated with specific owners, nodes associated with specific services, nodes associated with specific service providers, nodes associated with specific service instances or subsets of service instances and so on to converge upon a respective common determination of a designated node.

Moreover, various embodiments utilize a commonly agreed mechanism that enables each node to converge upon a common sequence of potential designated nodes. In these embodiments, if the designated node determined using the commonly agreed mechanism cannot perform the duties of a designated node, the next determined node within the sequence of determined nodes capable of performing the duties of a designated node is selected as the designated node.

Referring to box 225, the commonly agreed mechanism comprises bridge priority field data to identify the most important bridge or node and select that node as the designated node. In other embodiments, one or more other fields associated with the system identifier may be used. In other embodiments, other system identification or other database entries or fields associated with the various nodes may be used.

In other embodiments, an existing, modified or new type length value (TLV) associated with or introduced into the protocol is used to provide a commonly agreed mechanism. Generally speaking, each of the various embodiments utilizes one or more Multicast Route Priority Parameters (MRPPs) wherein each node within a set of nodes adhering to a specific commonly agreed mechanism uses the same MRPP to calculate the designated node or sequence of designated nodes. Generally speaking, each designated node is selected according to data such as an administrative name and/or an administrative priority. The name and/or priority may be modified in various embodiments to provide different "tie breaker" mechanisms within the commonly agreed mechanism so that a corresponding different forwarding tree would be provided. In various embodiments, an existing, modified and/or new TLV provide a different administrative weight factor such that a different forwarding tree is provided.

In one embodiment, such as to enable load spreading of multicast traffic over a small number of trees, one or more subsequent designated node priorities are distributed which result in the selection of different multicast tree designated nodes, subject to the first designated node priority. In one embodiment, the TLV has either a second priority or an indication to use multiple trees where the second priority designated node is also an active tree for some services. The extra data may comprise the number of trees and an identification of the services. In one embodiment, a current algorithm index for the multicast tree designated priority is used. For example a first algorithm uses a first designated node priority, a second algorithm uses a second designated node priority, and so on. This logic is optionally signaled by a proprietary algorithm or by adding a new TLV that identifies, using an algorithm number, those services that should be used by the next designated node priority.

In various embodiments, the commonly agreed mechanism is modified slightly for each of a plurality of subsets of service instances within the communications network, such as discussed above with respect to box 215. All of the nodes throughout the network supporting a particular service instance must select the same designated node. For example, each of the nodes throughout the network supporting a first subset of service instances operates according to a first commonly agreed mechanism to respectively determine a first node to function as the designated node, while each of the nodes throughout the network supporting a second subset of service instances operates according to a second commonly agreed mechanism to respectively determine a second node to function as the designated node. The commonly agreed mechanism of one subset of service instances may be the same as or different than the commonly agreed mechanism of another subset of service instances. Moreover, even where the commonly agreed mechanism is different between subsets of service instances, the determined designated node or sequence thereof of one subset of service instances may be the same or different the determined designated node or sequence thereof of another subset of service instances.

At step 230, each node operates according to the commonly agreed mechanism to respectively determine which node should function as a designated node (DN). Referring to box 235, the nodes may operate to converge upon a single DN or upon a sequence of potential DNs. For example, if a first node determined to be the DN is not able to function as the DN (e.g., congested above a threshold level, insufficiently resourced etc.), then a next potential DN in the sequence of potential DNs is selected. This process is repeated until a selected DN is capable of performing as the function of the DN.

At step 240, each node operates to determine a shortest path between the determined designated node and each of a plurality of other nodes within the communications network or relevant portion thereof. That is, for each DN, a forwarding tree representing paths emanating from the DN is computed by each node.

At step 250, for each of the paths determined at step 240, each node included within a determined path adds respective multicast forwarding address data to the path, such as by selecting for inclusion in a respective forwarding tree for multicast only those determined shortest paths from the DN traversing the respective node. That is, the forwarding tree representing paths emanating from the DN is augmented with additional forwarding address data from each respective node, but only where the forwarding tree includes paths traversing the respective node to arrive at the *,G tree to be used by the node for multicast services.

In operation, various embodiments determine shortest path bridging (SPB) of multicast frames within a communications network by performing the following steps at each of a plurality of nodes in the network, or each of a plurality of nodes supporting a subset of services instances: (1) determining a designated node (DN) according to a commonly agreed mechanism; (2) determining a shortest path between the DN and each of the plurality of nodes; and (3) selecting for inclusion in a respective forwarding tree for multicast only those determined shortest paths from the DN traversing the respective node.

The method of FIG. 2 provides for each node within a network or portion thereof to have stored therein a *,G tree based on its respective DN that comprises shortest paths emanating from the DN and further has only those multicast paths associated with the respective node.

In various embodiments, a node applies further pruning operations to the *,G Tree stored therein to reduce the amount of memory resources required.

Figure 3:
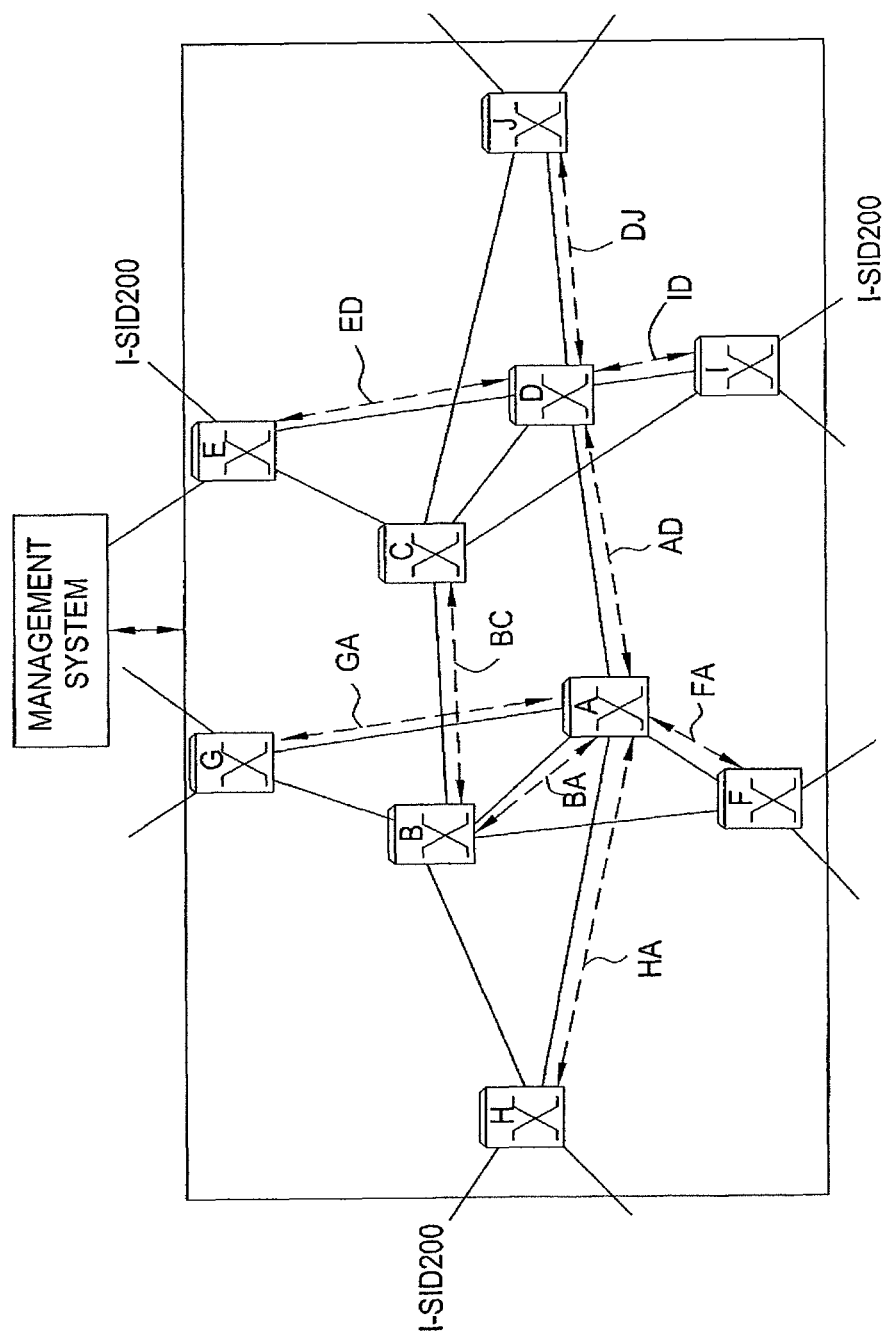
FIG. 3 depicts the high-level block diagram of the communication network of FIG. 1 in which a *,G Tree computed with a designated node is illustrated.

FIG. 3 depicts the high-level block diagram of the communication network of FIG. 1 in which a *,G Tree computed with a designated node is illustrated. Specifically, FIG. 3 depicts the communication network 110 wherein each of the nodes 112 has determined that node 112A is the designated node (DN) to form a shortest path *,G Tree using the following paths: AH, AB, AF, AG, AD, BC, DE, DI and DJ.

In particular, FIG. 3 along with Tables 1-4 (below) illustrate the relative savings according to various embodiments. Referring to FIG. 3, it is seen that each of nodes E, I and H are associated with a service instance denoted as I-SID 200.

Tables 1 and 2 illustrate the Multicast Filter/Forwarding entry Information Base (MFIB) usage at, respectively nodes C and D using conventional techniques wherein a designated node and the related techniques as discussed herein are not used. In particular, one MFIB entry is required for every transiting multicast, while one tree computation is required for unicast and current node's multicast. Thus, MFIB usage at C includes 12 entries and 10 tree computations (Table 1), while as shown in Table 2 MFIB usage at D requires 13 entries and 10 tree computations (Table 2).

As an example of the nomenclature used in the tables, and referring to Table 1:

Row 1 indicates that a Service ISID default (i.e., a service going everywhere that is never pruned) on node C from Node A C would support a Source specific address of A terminating on C in the multicast Forwarding Information Database (MFIB);

Row 2 indicates that a Service ISID default on node C from Node B C would support a Source specific address of B to links going to D, E, I and J and a terminating Service on C; and Row 11 indicates that for a Service ISID 200 on node C from Node E, C would support a Source specific address of E transiting to Node I. This is a pruned list which can be seen by comparison to row 5, where for the default I-SID there are 3 links and node C is supported, but since ISIS 200 does not exist on C, I or J the three links are pruned.

The shading and C* mean that the particular address entry is supported on Node C but is never forwarded off node C (there are no links). These entries take memory just the same and would be passed on to another internal table look up. For the purpose of this discussion it is relevant to note that the entries take resources per source.

Generally speaking, Table 1 depicts multicast addresses required to support an I-SID. The properties of table reduction and pruning are illustrated. Tables 1-4 use a default I-SID comprising a service that goes to substantially all nodes. Table 1 along with Table 3 help illustrate the properties of table reduction for a widely distributed service. Default I-SIDs are used for a data path to reach all nodes.

TABLE 1

(Entries at Node C)

| I-SID | MFIB |
|---|---|
| Default | A -> C* |
| Default | B -> D, C, E, I, J |
| Default | C -> Any |
| Default | D -> C* |
| Default | E -> B, C, I, J |
| Default | F -> C* |
| Default | G -> C* |
| Default | H -> C* |
| Default | I -> B, C, E, J |
| Default | J -> B, C, E, I |
| 200 | E -> I |
| 200 | I -> E |

TABLE 2

(Entries at Node D)

| I-SID | MFIB |
|---|---|
| Default | A -> D, E, I, J |
| Default | B -> D* |
| Default | D -> Any |
| Default | E -> A, D, F, H, G |
| Default | F -> D, I, J |
| Default | G -> D, I, J |
| Default | H -> D, I, J |
| Default | I -> A, D, F, G, H |
| Default | J -> A, D, F, G, H |
| 200 | E -> H |
| 200 | H -> E |
| 200 | I -> H |
| 200 | H -> I |

Tables 3 and 4 illustrate the MFIB usage at, respectively nodes C and D using embodiments described herein wherein node A is selected as a designated node. In particular, only one entry per I-SID is required when the I-SID goes through the node on the tree (unlike the one MFIB entry required for every transiting multicast of Tables 1 and 2). Thus, MFIB usage at C includes one entry and two tree computations (Table 3), while MFIB usage at D requires two entries and two tree computations (Table 4). This highlights the significant reduction in computation (e.g., one Multicast Tree plus one unicast) achieved using the various embodiments.

As an example of the nomenclature used in the tables, and referring to Table 3, Row 1 indicates that for a Service ISID default on node C from any Node C would support a *,G address of to links going to B and terminating on C. C only requires a single entry for the default I-SID, therefore providing for a reduction in required table resources. C is not on the shortest path for ISID 200, so it does not require ISID 200 at all (i.e., a reduction of table resources and further pruning over the earlier table for node C).

Table 4 illustrates the perspective from node D, which is on the shortest path for the default and ISID 200. D is on the path for the multicast tree for I-SID 200, so it cannot be pruned. The default I-SID is also depicted.

TABLE 3

(Entries at Node C)

| I-SID | MFIB |
|---|---|
| Default | C to/from B |

TABLE 4

(Entries at Node D)

| I-SID | MFIB |
|---|---|
| Default | D to/from A, E, J, I |
| 200 | E->I, H; I->E, H, H->E, I |

The reduction in table size exhibited between Tables 1, 2 and tables 3, 4 is due to the use of *,G addressing in which there is one entry and a list of ports. It is noted that unicast forwarding and multicast forwarding use lookup tables that are indexed by destination address. The various embodiments provide multicast forwarding tables having an ability to lookup and replicate frames. In embodiments using optional hardware assist, the scaling of multicast is subject to the use of such hardware resources. Various embodiments provide pruning as part of the multicast tree; such pruning is applicable to both the described embodiments as well as other arrangements described within the SPB specification. Pruning occurs when no leafs of a forwarding tree beyond a merge point require the respective multicast entry (since there is no service that is associated with the I-SID).

Various embodiments are generally described within the context of a highly efficient single tree embodiment. However, various other embodiments utilize multiple trees which allow for load-balancing, redundant service paths, special-purpose paths and the like.

In particular, a single tree computation based on a path identifier methodology is used in which the operational node having the lowest node priority of all operational nodes is determined to be the designated node. A single tree is built based on link metrics and low path identifier tiebreakers for this node. For example, the various steps of the method 200 of FIG. 2 are adapted to select, as the designated node, the operational node having the lowest node priority of all operational nodes. The advantages of the various embodiments are found in reducing resource requirements to perform the various calculations, store forwarding tree data and the like. At times the shortest path for unicast may not be the path calculated using some embodiments. For example, referring to FIG. 3 it can be seen that switch A is the best priority node and multicast designated node. However, for switch I the difference is small but the path to switch C from switch A in multicast is three hops (ID, DA, AB, BC) versus the direct one hop (IC) shortest path for unicast.

Figure 4:
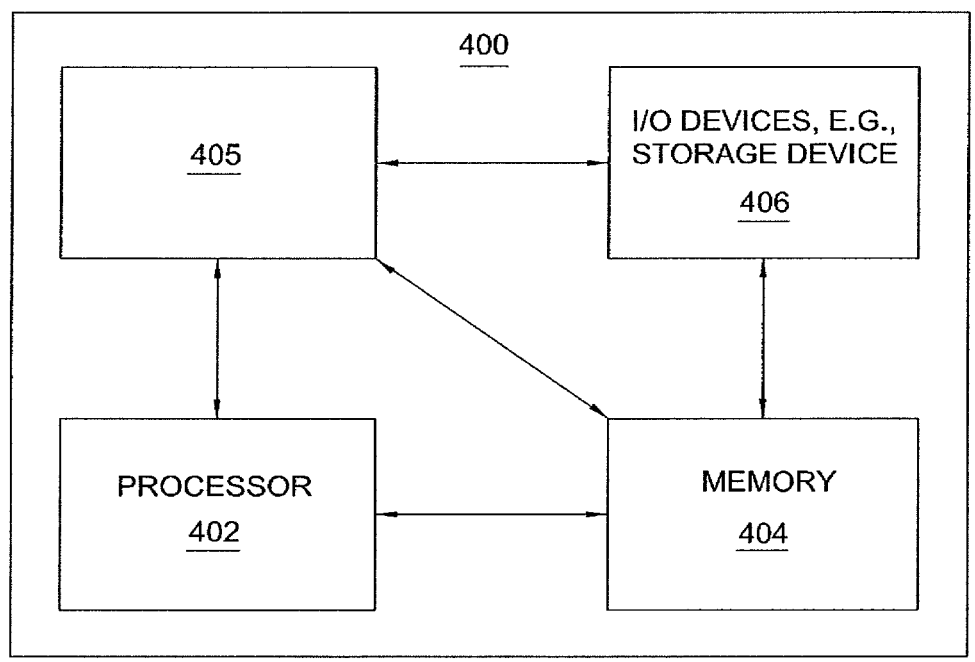
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), an RMT management module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the method 200 and modifications thereof can be loaded into memory 404 and executed by processor 402 to implement the functions as discussed above. As such the method 200 (including associated data structures) of the present invention can be stored on a computer readable medium or carrier, e.g., RAM memory, magnetic or optical drive or diskette, and the like. Advantageously, the various embodiments scale easily as network size grows. The embodiments generally maintain the current multicast scaling capabilities while allowing link state and shortest path forwarding for unicast. The embodiments may use a single tree that is not congruent with the shortest path while enabling current Provider Backbone (PBB) Network Forwarding to remain intact.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method of determining forwarding tree data at a node within a communications network, the method comprising:
    determining, at said node, a designated node (DN) associated with a shortest path tree according to a commonly agreed mechanism;
    determining, at said node, a forwarding tree comprising a set of shortest paths between said DN and respective other nodes within said communications network;
    selecting at said node for inclusion in node forwarding tree data supporting said shortest path tree only those shortest paths of the forwarding tree that traverse said node; and
    propagating traffic from said node based on said node forwarding tree data.

2. The method of claim 1, wherein said method is repeated for each of a plurality of shortest path trees.

3. The method of claim 2, wherein each of said plurality of shortest path trees comprise one of a unicast tree and a multicast tree.

4. The method of claim 2, wherein each of said plurality of shortest path trees comprises a respective service instance.

5. The method of claim 2, wherein a respective commonly agreed mechanism is used for each of said plurality of shortest path trees.

6. The method of claim 1, wherein said method is performed at each of a plurality of nodes within the network, each of said nodes determining said DN associated with said shortest path tree according to said commonly agreed mechanism.

7. The method of claim 1, wherein said node forwarding tree data is stored at said node in a Forwarding Information Base (FIB).

8. The method of claim 1, wherein said DN comprises a lowest priority operational node.

9. The method of claim 1, wherein the shortest path tree is built using link metrics associated with said DN.

10. The method of claim 1, wherein the shortest path tree is built using tiebreakers associated with said DN.

11. The method of claim 1, wherein said node forwarding tree data stored at said node comprises a *,G tree based on the shortest path tree.

12. The method of claim 1, wherein said method is repeated at said node for each of a plurality of service instances, said node forwarding tree data including data associated with each of said plurality of service instances.

13. The method of claim 12, wherein said node forwarding tree data stored at said node comprises, for each of said plurality of service instances, a respective *,G tree.

14. The method of claim 1, wherein the commonly agreed mechanism comprises a system identification field.

15. The method of claim 1, wherein the commonly agreed mechanism comprises a bridge priority field.

16. The method of claim 1, wherein the commonly agreed mechanism comprises any existing type length value (TLV) associated with a shortest path bridging protocol.

17. The method of claim 1, wherein the commonly agreed mechanism comprises a new type length value (TLV) introduced to a shortest path bridging protocol.

18. The method of claim 1, wherein said selecting comprises pruning said forwarding tree to exclude ones of the shortest paths between said DN and said respective other nodes.

19. A non-transitory computer-readable storage medium storing instructions which, when executed by a computer, configure the operation of the computer to provide a method of determining forwarding tree data at a node within a communications network, the method comprising:
   determining, at said node, a designated node (DN) associated with a shortest path tree according to a commonly agreed mechanism;
   determining, at said node, a forwarding tree comprising a set of shortest paths between said DN and respective other nodes within said communications network;
   selecting at said node for inclusion in node forwarding tree data supporting said shortest path tree only those shortest paths of the forwarding tree that traverse said node; and
   propagating traffic from said node based on said node forwarding tree data.

20. A computer program product comprising a non-transitory computer-readable storage medium storing instructions which, when executed by a processor in a telecom network element, configure the operation of the telecom network element to provide a method of determining forwarding tree data at a node within a communications network, the method comprising:
   determining, at said node, a designated node (DN) associated with a shortest path tree according to a commonly agreed mechanism;
   determining, at said node, a forwarding tree comprising a set of shortest paths between said DN and respective other nodes within said communications network;
   selecting at said node for inclusion in node forwarding tree data supporting said shortest path tree only those shortest paths of the forwarding tree that traverse said node; and
   propagating traffic from said node based on said node forwarding tree data.

21. An apparatus configured to determine forwarding tree data at a node within a communications network, the apparatus comprising:
   a processor and a memory communicatively connected to the processor, the processor configured to:
      determine, at said node, a designated node (DN) associated with a shortest path tree according to a commonly agreed mechanism;
      determine, at said node, a forwarding tree comprising a set of shortest paths between said DN and respective other nodes within said communications network;
      select at said node for inclusion in node forwarding tree data supporting said shortest path tree only those shortest paths of the forwarding tree that traverse said node; and
      propagate traffic from said node based on said node forwarding tree data.

22. The apparatus of claim 21, wherein the processor is configured to determine node forwarding tree data for each of a plurality of shortest path trees.

23. The apparatus of claim 22, wherein each of said plurality of shortest path trees comprise one of a unicast tree and a multicast tree.

24. The apparatus of claim 22, wherein each of said plurality of shortest path trees comprises a respective service instance.

25. The apparatus of claim 22, wherein a respective commonly agreed mechanism is used for each of said plurality of shortest path trees.

26. The apparatus of claim 21, wherein said shortest path trees comprise one of a unicast tree and a multicast tree.

27. The apparatus of claim 21, wherein the processor is configured to store said node forwarding tree data at said node in a Forwarding Information Base (FIB).

28. The apparatus of claim 21, wherein said DN comprises a lowest priority operational node.

29. The apparatus of claim 21, wherein the shortest path tree is built using link metrics associated with said DN.

30. The apparatus of claim 21, wherein the shortest path tree is built using tiebreakers associated with said DN.

31. The apparatus of claim 21, wherein said node forwarding tree data stored at said node comprises a *,G tree based on the shortest path tree.

32. The apparatus of claim 21, wherein the processor is configured to determine node forwarding tree data for each of a plurality of service instances, said node forwarding tree data including data associated with each of said plurality of service instances.

33. The apparatus of claim 32, wherein said node forwarding tree data stored at said node comprises, for each of said plurality of service instances, a respective *,G tree.

34. The apparatus of claim 21, wherein the commonly agreed mechanism comprises a system identification field.

35. The apparatus of claim 21, wherein the commonly agreed mechanism comprises a bridge priority field.

36. The apparatus of claim 21, wherein the commonly agreed mechanism comprises any existing type length value (TLV) associated with a shortest path bridging protocol.

37. The apparatus of claim 21, wherein the commonly agreed mechanism comprises a new type length value (TLV) introduced to a shortest path bridging protocol.

38. The apparatus of claim 21, wherein, to select only those shortest paths of the forwarding tree that traverse said node, the processor is configured to:
   prune said forwarding tree to exclude ones of the shortest paths between said DN and said respective other nodes.

* * * * *